Jan. 1, 1935.  O. O. CECCARINI  1,986,425
APPARATUS FOR COLOR PHOTOGRAPHY
Filed Dec. 24, 1932

Inventor
Olindo O. Ceccarini
By Lyon+Lyon
Attorneys

Patented Jan. 1, 1935

1,986,425

UNITED STATES PATENT OFFICE 1,986,425

APPARATUS FOR COLOR PHOTOGRAPHY

Olindo O. Ceccarini, Beverly Hills, Calif.

Application December 24, 1932, Serial No. 648,737

3 Claims. (Cl. 88—1)

This invention relates to an apparatus whereby a plurality of identical photographic images may be produced simultaneously and is particularly adapted for the production of two or more photographic images which are identical as far as light intensity and geometric similarity is concerned and merely differ in the color values recorded on said images.

The invention also relates to an apparatus whereby a plurality of images identical geometrically may be simultaneously obtained on separate light-sensitive surfaces.

For purposes of simplicity, the invention will be described as it may be adapted to what is known as three color photography, in which three separate images obtained through three color filters may be recorded. The formation of three or more photographic images simultaneously has been proposed and attempted for a great number of years and prisms, mirrors, etc., have been used for this purpose. Heretofore, however, it has not been possible to obtain two or more photographic images which were identical geometrically and in color intensity. The photographic devices of the prior art caused the formation of doubles or secondary images which blurred or rendered indistinct the primary image and furthermore the photographic impressions received by one film or plate were always slightly different from the impressions received by another plate. Unless the two or more simultaneously taken but separate photographic records are absolutely identical geometrically, they can not be combined subsequently so as to form a complete color image or picture which has the desired definition. Furthermore, the cameras of the prior art have been bulky and heavy, and were limited either in the angle of view or in the speed of photography.

The apparatus of this invention obviates all of the difficulties heretofore encountered. The mode of operation of this invention contemplates the splitting up of a bundle of light rays into two or more divergent beams by partial reflection of the bundle of light rays. The separate light rays thus formed are then subjected to compensating refraction whereby geometrically identical photographic images may be attained. Furthermore, by the use of the arrangement of elements hereinafter described in detail, the use of wider angle and higher aperture lens, higher speeds and exposures under light conditions which ordinarily would not be practical, is now made possible.

An object is to disclose and provide an apparatus for producing a plurality of identical photographic images simultaneously whereby a bundle of light rays is split up by partial reflection and transmission into three light rays, and the reflected light rays then compensated by refraction so as to produce geometrically identical images.

A further object of this invention is to disclose and provide an arrangement of elements whereby the production of a plurality of geometrically identical images may be attained.

A still further object is to disclose and provide a compact three color camera employing half silvered mirrors and compensating refracting means.

In describing the invention, reference will be had to the appended drawing, in which Fig. 1 diagrammatically illustrates an arrangement of elements whereby three geometrically identical photographic images may be simultaneously produced.

Figures 1, 2, 3:
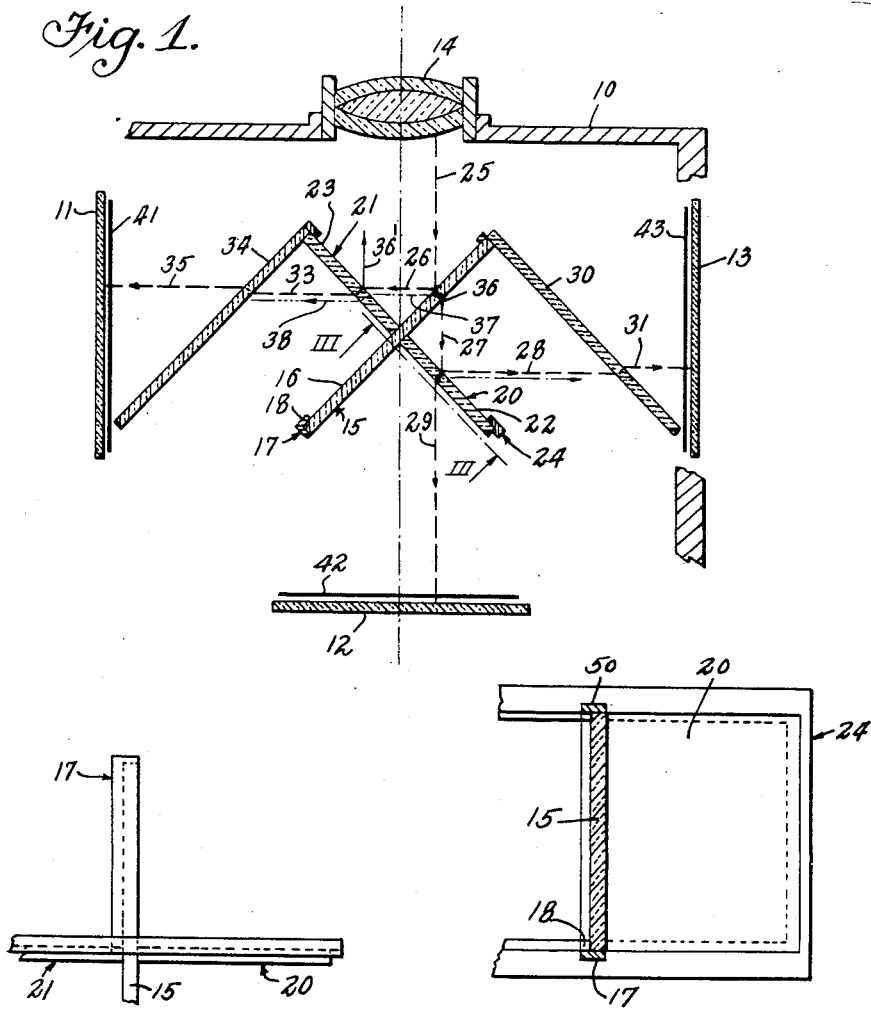
Fig. 2 is an enlarged plan view of a portion of the mirror system of the camera shown in Fig. 1.
Fig. 3 is a side elevation of a portion of the mirror system shown in Fig. 2, the elevation being taken along the plane 3—3 indicated in Fig. 1.

It is to be understood that the arrangement of elements shown in the drawing is merely illustrative of one form of device in which the method of this invention may be placed into operation, and that numerous changes, modifications and adaptations may be made.

The camera may include a suitable housing indicated at 10, provided with suitable plate holders adapted to hold and position the plates, films, or other light-sensitive elements 11, 12 and 13 in place at 90° to each other. A suitable photographic lens 14 is mounted in the housing 10, the optical axis of the lens passing through the center of the intermediate plate or film 12. Any astigmatic compound lens such as the Biotessar or the Tessar f2.8 or f3.5 lens, is well adapted for cameras of the type shown.

Positioned within the housing 10 are partially silvered mirrors in the form of a cross intersecting on the optical center line of the lens 14. The mirror 15 may be made of a single piece of glass semi-silvered on that side facing the lens 14 and indicated at 16. This mirror 15 is positioned in a plane at 45° to the optical axis. The mirror 15 may be held in a suitable frame 17 provided with a retaining flange 18 bearing against the semi-silvered surface, whereby such semi-silvered surface may be caused to lie in a substantially true and flat plane.

Another semi-silvered mirror composed of two portions 20 and 21, one on either side of the reflecting member 15, is positioned in a plane at 90° to the plane of the reflecting member 15. Surfaces 22 and 23 facing the lens 14 are partly silvered or otherwise made partly reflective. These two reflective members 20 and 21 are held in a suitable frame 24 also provided with flanges bearing against the semi-reflective surfaces 22 and 23. The two reflective components 15, and 20 and 21 are suitably held in fixed 90° relation.

A bundle of light rays is shown at 25. A portion of these light rays is reflected by the reflective surface 16 of the member 15 towards the left and towards the reflective member 21, as indicated at 26. Another portion of the bundle 25 passes through the reflective member 15 and is refracted thereby, being emitted as indicated at 27. In this manner, therefore, the reflective member 15 has split the incoming bundle of light rays into two beams 26 and 27 at 90° to each other.

The transmitted light ray 27 then hits the semi-silvered surface 22 of the member 20. A portion of such beam is therefore reflected, as indicated at 28, whereas the remainder of such light ray is refracted by its passage through the member 20 and is emitted as a transmitted light ray 29. The two angularly disposed, partly reflective members have therefore caused the original bundle of light rays 25 to be split up into three light rays 26, 28 and 29 directed along three diverging lines. It is to be noted, however, that the light ray 29 has been subjected to two refractions—one in its passage through the member 15 and another by its passage through the member 20. The beam 28, however, has only been refracted once, namely, by passing through the member 15. Images formed by the beams 28 and 29 would not be geometrically identical. In accordance with this invention, therefore, the beam 28 is corrected or compensated by passing such beam 28 through a refractive member 30, this member 30 being positioned in a plane paralleling the plane of the members 20 and 21 and at right angles to the plane of the semi-reflective member 15. By reason of such compensating member 30, the beam 28 is refracted by its passage therethrough and is emitted as the beam 31. This beam is now refracted to the same extent as the beam 29.

The light ray 26 reflected by the member 15 strikes the semi-silvered surface 23 of the member 21. A portion of the light ray is reflected towards the lens 14, as indicated at 36', and such portion is lost. The remainder of the light ray is refracted by its passage through the member 21 and then passes, as light ray 33, through another compensating refractive member 34 by means of which the light ray 33 is refracted so as to form a beam 35 which has been refracted practically the same extent as light rays 29 and 31. The compensating or corrective member 34 is positioned in a plane parallel to the semi-silvered member 15 and at 90° to the plane of the semi-silvered surfaces 22 and 23 of members 20 and 21.

It will be seen, therefore, that by providing the two semi-silvered intersecting members and the two compensating refractive members, it is possible to produce three geometrically identical images simultaneously. Furthermore, the light intensity of the rays 29, 31 and 35 is identical.

It is admitted that the use of semi-silvered mirrors in the manner described hereinabove gives rise to secondary images reflected at the rear or unsilvered surfaces of the mirrors. The beam 25, for example, upon striking the rear surface of the member 15, as indicated at 36, will be reflected. About 6% of the light reaching the back surface 36 will be thus reflected by such rear surface and discharged as a beam 37 paralleling the beam 26. This beam 37 will then be refracted by its passage through the semi-silvered mirror 21. About 50% of the light in the beam 37, however, will be reflected by the semi-silvered surface 23 so that the beam 38 transmitted through the member 21 will consist of less than 50% of the light intensity in beam 37.

If we assume that the incident light 25 has a value of 1.0, that the semi-silvered surfaces have a reflected power of 50%, and that 6% of the light reaching the rear surface 36 will be reflected therefrom, then the total value of the secondary beam 37 is only 0.5x0.06 or 0.03. 50% of this light will be reflected by the semi-silvered surface 23 and about 6% of the residue will be reflected from the secondary or rear surface of the member 21 so that the beam 38 has a total value of only about 0.014. This beam then has to pass through the correcting member 34, a portion of such beam being reflected from both front and rear surfaces of such member 34. It is evident, therefore, that the secondary beam 38 is of such low light intensity by the time it reaches the film or plate 11 that it will not record thereon during normal photographic operations.

Suitable color filters 41, 42 and 43 are positioned in front of the photographic films or plates 11, 12 and 13 respectively. It has been found desirable to use the red filter directly opposite the lens 14, in the position indicated by the filter 42. Furthermore a dummy translucent plate may be slidably mounted in the housing 10 so as to be readily moved into position instead of the light-sensitive plate 12, so as to facilitate focusing.

A specific example of a camera built in accordance with the description given hereinabove utilized an "f2.8" Biotessar lens having a focal length of about 6½ inches. The camera and lens utilized the entire field of 9x12 c. m. plates.

It is therefore evident that the construction described hereinabove permits the utilization of the maximum field for which the lens is designed even for ordinary portrait work. Furthermore, by using high speed panchromatic plates or film and color filters, an effective speed of exposure of the order of "f12" is attained, this being a speed far superior to any three color camera now available.

A speed of the order of approximately "f18," using color filters, may be obtained with a 21 c. m. "f3.5" Tessar lens in a camera using three plates 4"x 5" each. From these figures it will be obvious to those skilled in the art that exposures may be made by means of this camera in light conditions which ordinarily would render three color photography impractical. A high aperture lens may be used and the angle of view is much greater than that embraced by three color cameras in which two mirrors at 45° to each other but adjoining one another (not intersecting) are used. Furthermore the camera is light in construction, the reflectors are of rather small size (this being permitted by their nearness to the lens), and finally the three images which are obtained are identical in light intensity and geometrically.

In order to facilitate the construction of a camera of this character, one detail is shown in Figs. 2 and 3. In order to insure that the members 20 and 21 lie in the same plane, they are carried in a single frame 24 provided with an intermediate opening 50 through which the member 15 and its frame 17 may extend. The side flange 18 is cut off in the center so as to permit the edge of the member 21 to contact with the surface of the member 15.

Although a mode of operation and a camera for the production of three identical images has been described in detail for purposes of illustration, it is to be understood that the invention is not limited to the specific embodiments herein described but embraces all such changes, modifications and adaptations as come within the scope of the appended claims.

For example, it will be apparent to those skilled in the art that instead of using reflective planes at 90° to one another, a similar result can be obtained by employing two pairs of semi-reflective planes extending from a common line perpendicular to and intersecting the optical axis of the lens, said pairs of semi-reflective planes lying in planes oppositely but equally inclined to the optical axis.

For example, the member 15 may pass through and intersect the plane of members 20 and 21 so as to present a 60° angle to the lens 14 instead of the 90° angle shown in Fig. 1. The location and distance of the various plates or films 11, 12 and 13 from the line of intersection of the semi-reflective planes depends upon their angle to each other and the focal length of the lens 14. From a contemplation of this invention those skilled in the art will readily conceive of a number of forms that the invention may assume.

I claim:

1. In a photographic apparatus, the combination of a lens and four semi-reflective planes at 90° to each other, said semi-reflective planes lying in planes at 45° to a plane transverse to the optical axis of said lens, and a refracting member on each side of said semi-reflective planes, each of said refractive members being oppositely inclined at 45° to the optical axis and comprising plane glass having refractive characteristics substantially identical to the refractive characteristics of said semi-reflective planes.

2. In a photographic apparatus, the combination of a lens and four semi-reflective planes at 90° to each other extending from a common line perpendicular to and intersecting the optical axis of said lens, said semi-reflective planes lying in planes at 45° to a plane transverse to the optical axis of said lens, and a refracting member on each side of said semi-reflective planes, said refracting members lying in planes at 45° to the optical axis of said lens.

3. In a photographic apparatus, the combination of a lens, two pairs of semi-reflective planes extending from a common line perpendicular to and intersecting the optical axis of said lens, the reflective planes of each pair lying in the same plane, said pairs of semi-reflective planes lying in planes oppositely and equally inclined to a plane passing through the optical axis of said lens, and a refracting member on each side of said semi-reflective planes adapted to receive and correct light rays reflected by said semi-reflective planes, each of said refractive members comprising a plane of thickness equal to the thickness of a semireflective plane and parallel thereto.

OLINDO O. CECCARINI.